United States Patent [19]
Cook et al.

[11] Patent Number: 5,922,383
[45] Date of Patent: Jul. 13, 1999

[54] METHOD FOR BRINE FREE LONG TERM STORAGE OF PICKLES

[75] Inventors: James R. Cook, Shakopee; Judith A. Matthias, Bloomington; Thomas E. Hitch, Wayzata, all of Minn.

[73] Assignee: M.A. Gedney Co., Chaska, Mich.

[21] Appl. No.: 08/842,001

[22] Filed: Apr. 23, 1997

[51] Int. Cl.$^6$ ................... A23L 3/16; A23L 3/34; A23L 1/218
[52] U.S. Cl. .......... 426/324; 426/326; 426/321; 426/335; 426/399; 426/615; 426/270
[58] Field of Search .................... 426/106, 410, 426/615, 412, 399–401, 324, 326, 321, 335, 270

[56] References Cited

U.S. PATENT DOCUMENTS

| | | | |
|---|---|---|---|
| 2,542,206 | 2/1951 | Nichols | 426/410 |
| 3,102,034 | 8/1963 | Weinberg | 426/410 |
| 3,578,466 | 5/1971 | Wekmann et al. | 426/615 |
| 3,658,559 | 4/1972 | Mohwinkel | 426/412 |
| 3,717,479 | 2/1973 | Connick . | |
| 3,758,310 | 9/1973 | Briem | 426/410 |
| 3,773,527 | 11/1973 | Ruggerone | 426/106 |
| 3,865,351 | 2/1975 | Connick | 259/4 |
| 3,984,580 | 10/1976 | Gur-Arieh et al. | 426/399 |
| 4,352,827 | 10/1982 | Fleming et al. | 426/270 |
| 4,419,376 | 12/1983 | Hersom | 426/607 |
| 4,597,976 | 7/1986 | Doster et al. | 426/401 |
| 4,828,848 | 5/1989 | Owades | 426/49 |
| 4,844,929 | 7/1989 | Kingsley | 426/326 |
| 4,957,761 | 9/1990 | Hale | 426/410 |

FOREIGN PATENT DOCUMENTS

| | | | |
|---|---|---|---|
| 1245471 | 9/1971 | United Kingdom | 426/412 |

*Primary Examiner*—Steven Weinstein
*Attorney, Agent, or Firm*—Janal M. Kalis; Craig J. Lervick

[57] ABSTRACT

The present invention relates to a method for long term storage of pickles in an environment free of brine or other liquid media. The method includes treating cucumbers in a brine solution at a temperature of about 195° F. and then storing for about 24–72 hours at refrigeration temperatures to make pickles. The brine includes a preservative such as sodium benzoate. The brine is drained from the pickles. The pickles are packaged in a container free of brine or other liquid media at refrigeration temperatures.

11 Claims, No Drawings

METHOD FOR BRINE FREE LONG TERM STORAGE OF PICKLES

BACKGROUND OF INVENTION

The present invention relates to a brineless pickle and to a method for making the brineless pickle.

A use of canning technology to make pickles from cucumbers imparts to the pickle a flavor and texture that is unique and very distinguishable from the cucumber. Typically, canning includes steps of exposing the cucumbers to some degree of heat and then storing the cucumbers in a brine solution or suspension for an extended period of time, such as months. Pickles are universally stored in brine and are sold in a brine solution.

The Connick U.S. Pat. No. 3,865,351, issuing Feb. 11, 1975, describes a process for continuously exposing salt to water in order to produce a saturated brine that may be stored. Separately, a supply of liquid dextrose or liquid sugar is maintained in a heated condition. Measured quantities of the liquid dextrose are periodically introduced into a mixing zone of a mixer with water. The dextrose and water are agitated and additional ingredients such as phosphates and curing salts are added to the mixer. Periodically, quantities of both the saturated brine and the dextrose mixture are withdrawn in separate streams and are blended in a desired ratio to make a pickle formula.

The Owades U.S. Pat. No. 4,828,848, issuing May 9, 1989, describes a method of preparing pickled foods without using brine. Instead, brine is replaced by an aqueous solution of ethyl alcohol and an ingestible organic acid, such as acetic acid.

The Kingsley U.S. Pat. No. 4,844,929, issuing Jul. 4, 1989, describes a one step non-fermentative pickling process that includes a step of dissolving water and acid soluble compounds and dispersing the acid insoluble ingredients in the water in order to form an aqueous pickling media. Green stock such as peppers or cucumbers are then immersed in the aqueous pickling media. The method also included an addition of calcium to the brine at a level of about 760 parts per million.

The Flemming et al. U.S. Pat. No. 4,352,827, issuing Oct. 2, 1982, describes a device for purging produce with oxygen or carbon dioxide gas. The device also permits contact of the produce by a brine solution.

SUMMARY OF THE INVENTION

The present invention includes a method for long term storage of pickles for consumption in a container free of brine or other liquid media. The method includes contacting the pickles, in bulk, with a brine solution that has been heated to about 195° F., thereby forming a brine/pickle mixture and then gradually cooling the brine/pickle mixture to a refrigeration temperature. The resultant brine/pickle mixture is held within a refrigeration temperature range for 24-to-72 hours. The brine solution may include a preservative such as sodium benzoate. After the brine solution storage treatment, the brine solution is drained from the pickles and the pickles are packaged in a container free of brine solution or other liquid media. The present invention also includes a kit that includes a pickle and a container. The pickle is hermetically sealed in the container without the brine solution or any other liquid media and is stored at refrigeration temperatures.

DETAILED DESCRIPTION OF PREFERRED EMBODIMENTS

The method of the present invention for storing pickles for consumption in a container free of a brine solution for as long as about eight to nine months includes, in one embodiment, a step of blanching cucumbers that have been picked and washed, contacting the blanched cucumbers with a hot brine solution in order to kill any microorganisms growing on the surfaces of the cucumbers, containing the pickles for about 48 hours in the brine solution while the brine is cooled and wherein the brine solution preferably also includes a preservative such a sodium benzoate in a concentration of about 0.2% by weight, draining the brine solution, packing the brine solution treated pickles in a container that may or may not have been purged with nitrogen and hermetically sealing the container with the pickles enclosed within the container so that the pickles can be stored up to about 8-to-9 months at refrigeration temperatures.

As used herein, "refrigeration temperature" refers to a temperature within a range of about 32-to-50° F. "Brine" or "brine solution" as used herein refers to a sodium chloride and acetic acid solution of about 4-to-6% sodium chloride by weight and 1.2 to 1.6% acetic acid by volume. Brine solution embodiments may also include sodium benzoate as a preservative in a concentration of 0.2% by weight. Brine embodiments may also include calcium chloride in a concentration of 0.6% by weight as well as various spices, flavors and coloring agents.

It has surprisingly been found that by subjecting the pickles to a hot brine treatment with a preservative such as sodium benzoate and acetic acid, that pickles can be stored in a bag or other container without brine or any other liquid at refrigeration temperatures for a period of many months. Prior to the method of the present invention, there has been no precedent for long term pickle storage outside of an aqueous brine or an ethyl brine solution.

Cucumbers of virtually any size are suitable for use in the process of the present invention. Once harvested, the cucumbers are washed. It is contemplated that the cucumbers may be separated by size prior to or subsequent to a washing step. The washing step removes debris and dirt from the outer green skin of the cucumber.

Once washed, the cucumbers are, in one embodiment, blanched in hot water so that the skin temperature of the cucumber is about 140° F. and the internal cucumber temperature is about 110° F. Water in the blanching solution may additionally include salt. Salt is not required, however. It is not required for the method of the present invention that a blanching step be performed.

Once the cucumbers are blanched, the cucumbers are contacted and then stored in bulk with a hot brine solution. In particular, the hot brine is poured over the cucumbers. The temperature of the hot brine solution is about 195° F. The cucumbers are held in a bath of the brine while the brine is cooled to a refrigeration temperature. The cucumbers are treated for an average of about 48 hours within a time range of 24-to-72 hours at refrigeration temperatures.

The pickle-to-brine ratio is about 50/50, weight to weight. The brine solution is about 4-to-6% sodium chloride by weight. The brine solution additionally includes a preservative, such as sodium benzoate in a concentration of about 0.2% by weight. The brine solution also includes acetic acid in a concentration of about 1.2-to-1.6% by volume. It is also contemplated that other preservatives, such as, but not limited to, potassium sorbate may be used in lieu of sodium benzoate. In one other embodiment, it is contemplated that the cucumbers be irradiated prior to or during the brine treatment step.

The cucumbers are contacted with the hot brine in order to kill microorganisms on the surface of the cucumbers. The cucumbers are held in the cooled brine bath in order to take on the flavor, texture and other physical and chemical properties of pickles.

Once the brine solution is added to the pickles, a "finished product" chemistry results. The finished product salt concentration is within a range of 2.0% to 3.0% by weight. The acetic acid concentration is 0.6-to-0.8% by volume. The sodium benzoate concentration is 0.1% by weight.

Once the brine treatment is completed and stored, the brine is drained away from the cucumbers which are now pickles. The brine treatment step is a non-fermentative brining step.

Once the brine step is completed, the pickles are placed in a container, such as a plastic bag. It is preferable that the bag be a flexible bag that is impervious to oxygen. The bag is preferably purged with nitrogen and then is hermetically sealed. The bag containing the pickles is storable at refrigeration temperatures for a period of up to 8-to-9 months. It is typical, however, that the term of storage will be in the range of about 90 days.

While preferred embodiments of the present invention have been described, it should be understood that various changes, adaptations and modifications may be made therein without departing of the spirit of the invention and the scope of the appended claims.

What is claimed is:

1. A method for long term storage of pickles for consumption in an environment free of brine or other liquid media, comprising:

contacting a food to be pickled in a brine solution at a temperature of about 195° F. for a period of time sufficient to kill any microorganisms on the surface of the food;

cooling the brine and food to a refrigeration temperature and storing the food for about 24 to 72 hours in the brine at the refrigeration temperature to convert the food to a pickle, wherein the brine includes a preservative;

draining the brine from the pickle; and sealing the pickle in a container free of brine or other liquid media.

2. The method of claim 1 and further including blanching the food prior to the contacting step so that the food has a skin temperature of about 140° F. and an internal temperature of about 110° F.

3. The method of claim 1 wherein the preservative includes sodium benzoate present in a concentration of about 0.2% weight to weight.

4. The method of claim 1 wherein the brine solution further includes acetic acid.

5. The method of claim 4 wherein the acetic acid is added in a concentration of about 1.2 to 1.6% volume to volume.

6. The method of claim 1 wherein the container is purged with nitrogen concurrently with addition of the pickle.

7. The method of claim 1 and further including a step of storing the sealed container at a refrigeration temperature.

8. the method of claim 1 wherein the pickle in the sealing step is a finished product that has a salt concentration within a range of 2.0 to 3.0% by weight.

9. The method of claim 8 wherein the finished product has an acetic acid concentration of about 0.6 to 0.8% by volume.

10. The method of claim 1 wherein the food is a cucumber.

11. A method for long term storage of pickles for consumption in an environment free of brine or other liquid media, comprising:

contacting a food to be pickled in a hot brine solution at a temperature and for a period of time sufficient to kill any microorganisms on the surface of the food;

cooling the brine and food to a refrigeration temperature and storing the food for about 24 to 72 hours in the brine at the refrigeration temperature to convert the food to a pickle, wherein the brine includes a preservative;

draining the brine from the pickle; and sealing the pickle in a container free of brine or other liquid media.

* * * * *